United States Patent [19]

Ehnstrom et al.

[11] 3,894,156
[45] July 8, 1975

[54] METHOD FOR MASHING

[75] Inventors: Lars Karl Johan Ehnstrom, Tullinge; Zigurds Sviestins, Enskede, both of Sweden

[73] Assignee: Alfa-Laval AB, Tumba, Sweden

[22] Filed: Apr. 12, 1973

[21] Appl. No.: 350,639

[30] Foreign Application Priority Data
Apr. 13, 1972 Sweden............................ 4774/72

[52] U.S. Cl. ...................... 426/29; 426/29; 426/29; 239/4
[51] Int. Cl. .............................. C12c 7/04
[58] Field of Search ................. 426/28, 29; 99/276–278; 239/4, 336, 428.5; 137/34, 604

[56] References Cited
UNITED STATES PATENTS
2,082,222  6/1937  Siebel ................................ 426/29
3,048,489  8/1962  Blum.................................. 426/29
3,251,550  5/1966  Lippert et al. ......................... 239/4

*Primary Examiner*—A. Louis Monacell
*Assistant Examiner*—R. B. Penland
*Attorney, Agent, or Firm*—Cyrus S. Hapgood

[57] ABSTRACT

In the meshing of a finely divided raw material into a liquid for producing wort, the liquid is passed through a duct having a constriction, such as a venturi-tube, which creates an underpressure in the region of the constriction; and the finely divided material is introduced into the duct at this region of underpressure, thereby forming a suspension of the material in the liquid.

3 Claims, 1 Drawing Figure

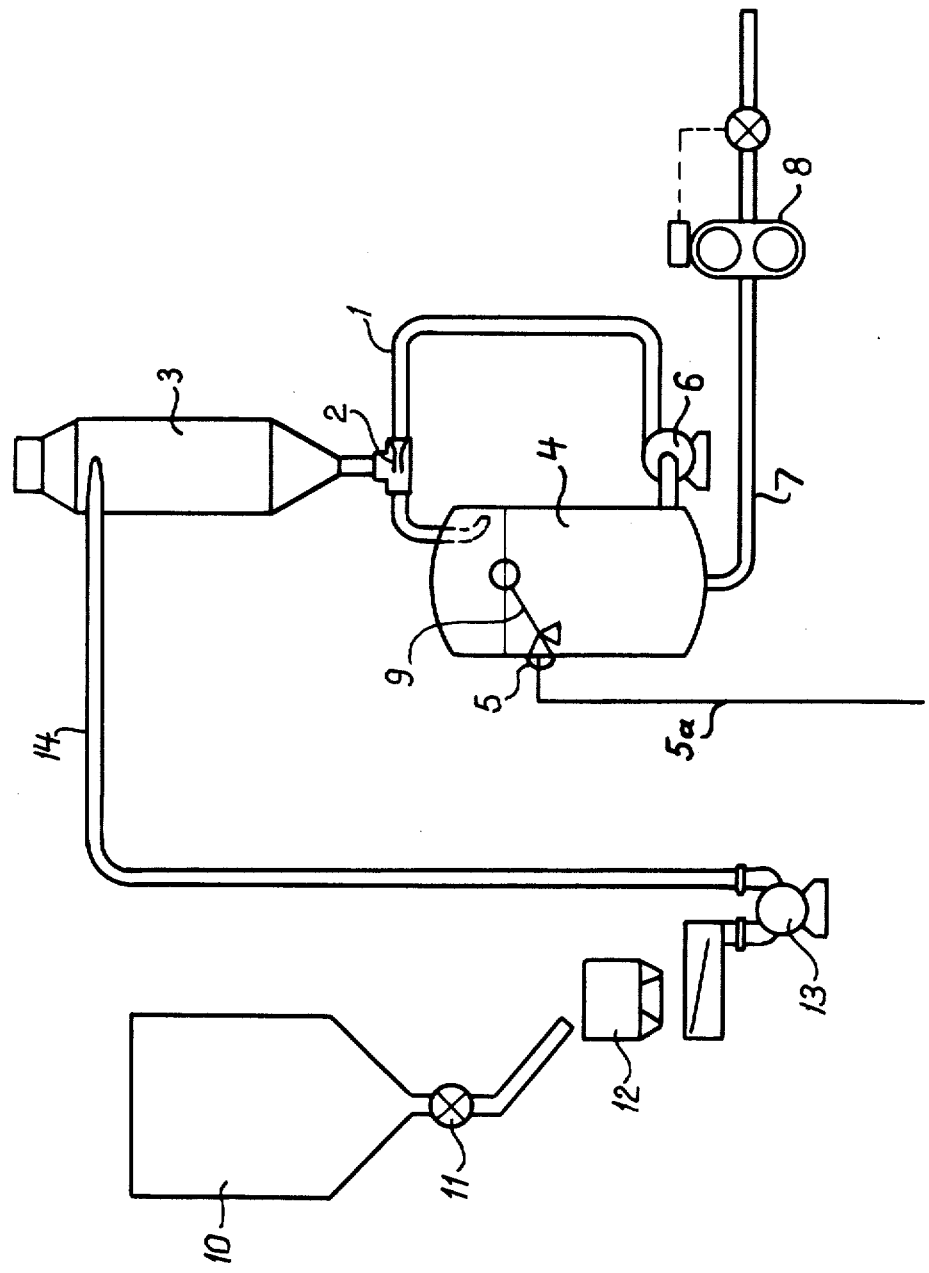

METHOD FOR MASHING

The present invention relates to a method of mashing into water or weak wort a finely divided raw material for the production of wort. The invention also relates to a system for practicing the method.

The raw material for mashing, as in the making of beer, generally consists of malt or unmalted grain with an addition of enzymes. Heretofore, the ground raw material used for the mashing into water has usually been mixed with water or weak wort in a mixing tank provided with a stirring device. The continuing development towards continuous processes has led to the necessity of dividing the raw material more and more finely. Also, this fine division of the raw material has the economical advantage that the material can be more profitably utilized. The reason for this is that on account of the fine division, the enzymatic reaction will not only take place quicker during the mashing, but higher yields will be obtained as well. This development with the utilization of a more finely ground raw material not only leads to advantages, but it creates difficulties as well. This is due to the fact that as the material becomes more finely divided, the risk of the formation of aggregates of small particles ("lumps") increases in connection with the mashing of the material into a liquid. Such an aggregate can be quite small, perhaps only some mm. in diameter, and may contain quite dry particles in its interior even after having been in contact with the liquid for a long time. The enzymatic activity may never reach such dry particles, or at least the start of such activity will be retarded in the interior of the aggregates, and the effect of the fine division therefore cannot be utilized in the desired manner.

One object of the present invention is to avoid the formation of aggregates of small particles in connection with the mashing. Another object is to disperse the finely divided raw material in water or weak wort so effectively that each particle of the same will immediately come into contact with the liquid. A further object of the invention is to make it possible to utilize the finely divided material at a maximum for the production of wort, so that the highest possible yield will be obtained.

The method according to the present invention is characterized mainly in that the water or the weak wort is caused to flow through a constriction in a duct, thereby creating an underpressure (sub-atmospheric pressure) in the duct at a point near the constriction, and the finely divided raw material is introduced into the duct at the point where the underpressure is prevailing. It has been found that aggregates of the finely divided material will "explode" when they are subjected to the said underpressure, and split into their elements of small particles.

In accordance with a preferred embodiment of the invention, the finely divided raw material is introduced into the duct by being sucked into the same, as from a container connected to the duct. Preferably, the finely divided raw material is sucked into the duct from a cyclone separator connected to the duct.

According to a particularly preferred embodiment of the new method, the primarily formed suspension is circulated in a duct forming a closed circuit so that the suspension passes the constriction in the duct while continuously introducing additional finely divided raw material. In this connection, a predetermined quantity (per unit of time) of the finely divided material is preferably fed continuously in a current of air to a cyclone separator connected to the circuit, a predetermined quantity (per unit of time) of formed suspension is taken away from the circuit, and such a quantity of water or weak wort (per unit of time) is introduced into the circuit that the circuit will contain a constant volume of suspension.

The invention will be described more in detail below with reference to the accompanying drawing, in which the single illustration is a schematic view of a system for practicing the method.

In the drawing, reference numeral 1 indicates a duct forming an enclosed path and having a constricted part 2 in the form of a venturi-tube. The duct forms a closed circuit in which a tank 4 is connected. Water or weak wort is led to the tank through a supply line 5a provided with a valve 5. A pump 6 is arranged to force liquid from the lower part of tank 4 through the constriction 2 and back to the tank. Near the constriction 2, a cyclone separator 3 is connected to the duct through the cyclone's apex, instead of an ordinary container. A duct 7 with a dosage pump 8 leads from the tank 4 and serves to discharge suspension at a predetermined rate from the circuit. The tank 4 is provided with a level sensing means 9 which is arranged to control the inflow of water or weak wort from supply line 5a so that the level in the tank is kept constant.

Numeral 10 indicates a container for malted grain (malt). A rotating feeder 11 is arranged to feed the malt continuously to a weighing device 12 which weights out a predetermined quantity of malt per unit of time to a flour mill 13. The malt ground in the flour mill is blown by a fan to the cyclone separator 3 via a duct 14. The air transporting the flour to the cyclone separator is separated in a known manner and escapes thruogh the air outlet at the top of the cyclone separator, whereas the flour is sucked out in a finely divided form from the apex of the cyclone separator and into the duct 1 on account of the underpressure prevailing at the constriction 2. It has proved to be particularly advantageous to supply the flour to the duct 1 via a cyclone separator, as it will then be led to the duct in the form of a fine dispersion in air.

Since a predetermined quantity of malted grain is fed to the system per unit of time, and a predetermined quantity of suspension is discharged from the closed circuit per unit of time, the suspension will continuously contain the same quantity of solids per unit of volume if the volume of the circuit is kept constant. The volume is kept constant by keeping the liquid level in tank 4 constant by the action of the level sensing means 9 and valve 5 controlled by such means.

The conditions needed for creating a suitable underpressure close to the constriction 2, by passing the liquid through the constriction, are well known and understood by technicians of this art with ordinary skill. The dimensions of the duct 1 and the constriction 2 depend upon the content of solid particles in the suspension, on its temperature and on the resistance in the duct and the capacity of the pump 6. All these details are well known to the skilled designer.

In the following claims, the term "liquid" refers to either water or weak wort used for the mashing operation.

We claim:

1. In the mashing of a finely divided raw material into a liquid for the production of wort, the method comprising the steps of passing said liquid through an enclosed path having a constricted portion, creating an underpressure in the path at the region of said constricted portion, subjecting the finely divided raw material to a cyclone separating operation to form a fine dispersion of said material in air, and causing said dispersion to be sucked into said path at a point where said underpressure prevails, thereby forming a suspension of said material in the liquid.

2. The method of claim 1, which also comprises circulating a liquid suspension of said material through a closed circuit including said path, while continuously introducing additional finely divided raw material into said circuit, continuously introducing said liquid into said circuit during said circulation and in a quantity corresponding to the quantity of said additional raw material which is introduced, and continuously discharging part of the circulating suspension from said circuit.

3. The method of claim 2, in which said additional finely divided material is introduced at a predetermined rate into the closed circuit, said part of the circulating suspension being discharged from the circuit at a predetermined rate, said liquid being introduced into the circuit at a rate which maintains a constant volume of suspension in said circuit.

* * * * *